Feb. 23, 1954

C. O. BATHGATE 2,670,458

PROXIMITY AMMETER

Filed Feb. 3, 1950

INVENTOR.
CARL O. BATHGATE
BY *James M Nichols*

ATTORNEY

Patented Feb. 23, 1954

2,670,458

UNITED STATES PATENT OFFICE 2,670,458

PROXIMITY AMMETER

Carl O. Bathgate, Rumson, N. J., assignor to Bendix Aviation Corporation, Teterboro, N. J., a corporation of Delaware Application February 3, 1950, Serial No. 142,265

3 Claims. (Cl. 324—147)

The present invention relates to electrical measuring instruments and more particularly to electrical measuring instruments of the proximity type.

Due to increased demands put on generating equipment required by greater current loads in mobile equipment, shunts have become an increasing problem in ammeter circuits. In most installations, it is a decided disadvantage to have the circuit dependent upon an ammeter or a shunt where the failure of the ammeter or shunt would disable the circuit. In order to overcome the above disadvantages, it is an object of the invention to provide an ammeter requiring no direct wire connections.

A further object of the invention is to provide an improved proximity ammeter.

A further object of this invention is to provide an improved current measuring device.

A further object of the invention is to provide an improved self-contained current measuring instrument for positioning adjacent to a conductor to give a direct reading of current.

These and other objects and features of the invention will appear more full hereinafter from a consideration of the following description taken in connection with the accompanying drawing wherein two embodiments of the invention are illustrated by way of example.

Figure 1:
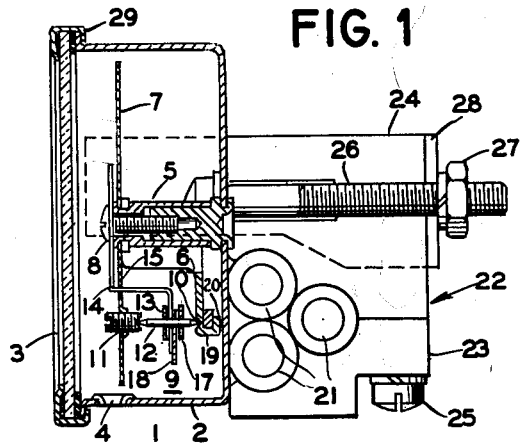
Figure 1 is a sectional side view of a meter embodying the invention.
Figure 2:
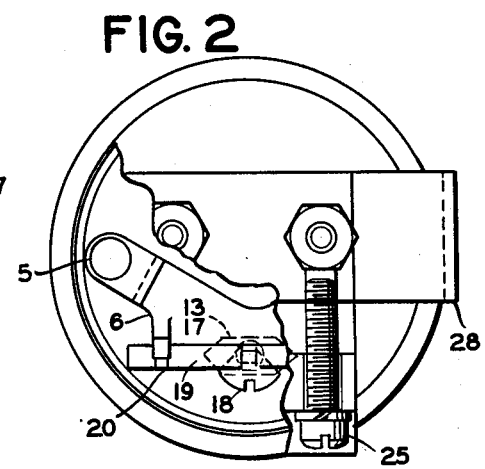
Figure 2 is a partial cutaway rear view of the meter of Figure 1.
Figure 3:
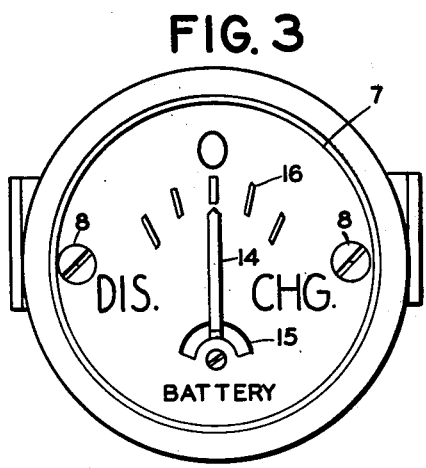
Figure 3 is a front view of the meter of Figure 1.

Referring to Figures 1, 2 and 3 of the drawing, there is shown an ammeter 1 having a non-magnetic housing 2 with a transparent window 3 for the front part. The housing 2 may have a window 4 in the side thereof for indirect lighting of the meter from an external source of light (not shown). The windows 3 and 4 are fastened to the housing 2 in any suitable manner.

A pair of non-magnetic support members 5 are attached to the rear of housing 2 by spinning, as illustrated, or in any other suitable manner. A hanger 6 and a dial 7 are secured to the opposite end of the support members 5 by screws 8 or in any other suitable manner.

A movement unit 9 is supported between a bearing seat 10 in the bracket 6 and an adjustable bearing seat 11 in the dial 7. A spindle 12 is rotatably mounted by the bearing seats 10 and 11. The spindle 12 has a soft iron armature 13 mounted in a fixed position thereon. A pointer 14 is securely fixed to the spindle and extends through an opening 15 in the dial 7 which moves over a scale 16 on the dial 7. A soft iron zeroing armature 17 is carried by the spindle 12 and is mounted for axial movement relative to the armature 13. A counterbalance 18 is mounted on the spindle to offset the weight of the pointer 14.

A permanent magnet 19 is secured to the hanger 6 adjacent to the movement unit 9 by clips 20 or any other suitable manner.

Current carrying conductors 21 are held in fixed relation to the movement unit 9 by means of a bracket or clamp 22. The clamp 22 has a removable portion 23 secured to a fixed portion 24 by a screw 25. The clamp 22 is attached to the housing 2 by means of bolts 26 and nuts 27. A mounting bracket 28 is also held by the bolts 26 and nuts 27 and cooperates with a flange 29 on the housing 2 for securing the meter to an instrument panel (not shown).

Figure 4:
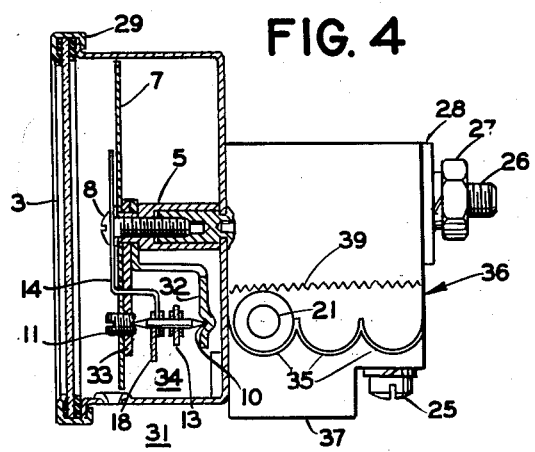
Figure 4 is a sectional side view showing a different embodiment of the invention.
Figure 5:
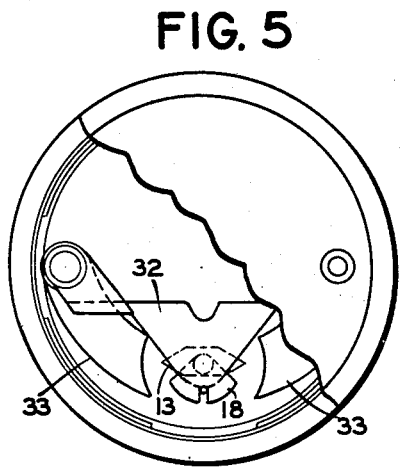
Figure 5 is a partial cutaway rear view of the meter of Figure 1.

Referring now to Figures 4 and 5 for another embodiment of the invention wherein like parts have been assigned the same reference numerals as in Figures 1, 2 and 3, there is shown an ammeter 31 having a non-magnetic housing 2 with a transparent window 3 forming the front thereof as previously described.

A pair of non-magnetic support members 5 are secured to the rear wall of the housing 2 in any suitable manner. A bracket member 32 is carried between the two support members 5 and is secured thereto. A permanent magnet 33 is pivotally mounted on each of the support members 5. Also carried by the support members 5 is a dial 7. The bracket member 32, magnets 33 and dial 7 are secured to the support members 5 by screws 8.

A movement unit 34 has a spindle 12 rotatably supported by the bearing seat 10 in the bracket member 32 and the adjustable bearing seat 11 in the dial 7. The spindle 12 carries a soft iron armature 13 attached for rotation therewith. Also, securely attached to the spindle 12, is the pointer 14 and counterbalance 18.

The current carrying conductor 21 is held in fixed relation to the movement unit 34 by a clamp 36. The clamp 36 has a removable portion 37 secured to a fixed portion 38 by means of the screw 25. The portion 37 has a plurality of slots 35 for selectively placing the conductor 21 in a predetermined position relative to the movement unit 34. The fixed portion 38 has a serrated section 39 adapted to grip the conductor 21 in order to retain it in the selected position.

The invention operates upon the principle that a current passed through a conductor produces a field with its strength proportional to the current flowing therein and its strength varying proportionately with the distance from the center of the conductor. Also that two or more conductors placed adjacent to each other produce a field with strength that is proportionately stronger than for a single conductor. The increase in field strength is additive as the number of conductors increase. Thus, it can be readily seen that the invention is not limited to any specific number of conductors but may be one or more as desired.

In operation, the assembled unit is placed adjacent to a current-carrying conductor and the influence of the magnetic field of the conductor affects the armature 13 in a manner to cause it to tend to align itself with the magnetic flux lines of the conductor field. As the armature 13 is secured to the spindle 12, the movement thereof is indicated by the pointer 14 and is proportional to the field strength.

In order to calibrate the instrument and to provide means for zeroing the pointer and to prevent oscillations thereof, the small permanent magnet 19 is installed adjacent to the moving armature 13 and in such a position so as to be in the magnetic flux field of the conductor 21. The addition zeroing armature 17 is adjusted in relation to the magnet 19 to bring the pointer to zero upon no current flowing in the conductor. Once adjusted the armature 17 remains fixed. To calibrate the instrument for full scale deflection for a predetermined value of current, the armature 13 is adjusted relative to the conductor 21 to provide the desired scale deflection.

In the operation of the embodiment of Figures 4 and 5, the assembled unit is placed adjacent to the conductor 21. The magnets 33 set up a normal magnetic flux field upon no current flowing in the conductor 21 which affects the armature 13 to cause it to zero the pointer 14. When current is passed through the conductor 21, an unbalanced field is then set up between the pole pieces of the magnets 33 to cause a greater pull on one side of the armature 13, depending on the direction of current flow.

In order to calibrate the instrument so as to limit the amount of pointer deflection for a given current, the magnets 33 are spread apart. By properly spacing the magnets 33 relative to each other, any desired calibration may be obtained.

In instruments of this type, it is desirable to have a multiple range in order to obtain a full scale deflection for currents of different values without recalibrating the meter. As the strength of the field produced by the current passing through the conductor varies proportionately with the distance from the center of the conductor, the clamp 36 has a plurality of slots 39, one of which may be selected for positioning the conductor 21 to give the desired deflection. Moving the conductor 21 to another slot will give a different deflection. For example, the first slot may be calibrated for 15 amperes, the second for 30 amperes. Thus, when the conductor is in the first slot, the meter would have a full scale deflection for 15 amperes, and when the conductor is in the second slot, the meter would have a full scale deflection for 30 amperes. While only two slots have been illustrated, it is understood that it is not limited to two but may be one or more depending upon the requirements of the particular application. Also the clamps 22 and 36 are interchangeable and may be used on either embodiment. Thus, by merely changing the clamps, the instrument will cover a wide range of current values.

Although only two embodiments of the invention have been illustrated and described, various changes in the form and relative arrangement of the parts, which will now appear to those skilled in the art, may be made without departing from the scope of the invention.

What is claimed is:

1. An electrical measuring instrument which is actuated by current flowing in a conductor adjacent thereto, comprising a non-magnetic housing, a pair of supporting members secured thereto, a bracket member and a dial plate secured to said supporting members, a shaft rotatably supported by said dial plate and said bracket member, said shaft having an armature, a pointer, a zeroing armature, and a counter-balance attached thereto and rotatable with said shaft, a stationary permanent magnet secured to said bracket member and so positioned with respect to said zeroing armature to effect said zeroing armature so as to maintain said pointer in a predetermined position in the absence of current flow in a conductor adjacent thereto, non-magnetic means for positioning said instrument relative to a conductor in which the current therein is to be measured.

2. An electrical measuring instrument which is actuated by current flowing in a conductor adjacent thereto, comprising a non-magnetic housing, a pair of supporting members secured thereto, a bracket member and a dial plate secured to said supporting members, a shaft rotatably supported by said dial plate and said bracket member, said shaft having an armature, a pointer, a zeroing armature, and a counterbalance attached thereto and rotatable with said shaft, a stationary permanent magnet secured to said bracket member and so positioned with respect to said zeroing armature to effect said zeroing armature so as to maintain said pointer in a predetermined position in the absence of current flow in a conductor adjacent thereto, non-magnetic means for positioning said instrument relative to a conductor in which the current therein is to be measured, and means for varying the position of said first armature relative to said conductor to calibrate the deflection of said pointer for a predetermined current.

3. An electrical measuring instrument which is actuated by current flowing in a conductor adjacent thereto, comprising a non-magnetic housing, a pair of supporting members secured thereto, a bracket member and a dial plate secured to said supporting members, a shaft rotatably supported by said dial plate and said bracket member, said shaft having an armature, a pointer, a zeroing armature, and a counterbalance attached thereto and rotatable with said shaft, a stationary permanent magnet secured to said bracket member and so positioned with respect to said zeroing armature to effect said zeroing armature so as to maintain said pointer in a predetermined position in the absence of current flow in a conductor adjacent thereto, non-magnetic means for positioning said instrument relative to a conductor in which the current therein is to be measured, and non-magnetic means for varying the position of said conductor relative to said first armature to calibrate the deflection of said pointer for predetermined current values.

CARL O. BATHGATE.

References Cited in the file of this patent

UNITED STATES PATENTS

| Number | Name | Date |
|---|---|---|
| 606,369 | Varley | June 28, 1898 |
| 634,965 | Thomson | Oct. 17, 1899 |
| 1,580,768 | Todd | Apr. 13, 1926 |
| 1,663,768 | Miller | Mar. 27, 1928 |
| 1,735,919 | Eshbaugh | Nov. 19, 1929 |
| 1,912,800 | Stanton | June 6, 1933 |
| 1,924,039 | Hockley | Aug. 22, 1933 |
| 1,929,714 | Reich | Oct. 10, 1933 |
| 2,002,445 | Arey et al. | May 21, 1935 |
| 2,089,083 | Arey | Aug. 3, 1937 |
| 2,146,555 | Arey | Feb. 7, 1939 |
| 2,175,046 | Warner | Oct. 3, 1939 |
| 2,345,430 | Rich | Mar. 28, 1944 |
| 2,430,465 | Grady | Nov. 11, 1947 |
| 2,440,244 | Brown | Apr. 27, 1948 |
| 2,484,567 | Hoare | Oct. 11, 1949 |
| 2,624,769 | Diehl | Jan. 6, 1953 |